United States Patent [19]

Schol et al.

[11] Patent Number: 5,308,628
[45] Date of Patent: May 3, 1994

[54] METHOD OF PREPARING A FROZEN DAIRY DESSERTS

[75] Inventors: Cor J. Schol; Martinus M. G. M. van der Houven, both of Veghel, Netherlands

[73] Assignee: Campina Melkune, B.V., 's-Hertogenbosch, Netherlands

[21] Appl. No.: 924,403

[22] Filed: Aug. 3, 1992

Related U.S. Application Data

[63] Continuation of Ser. No. 641,853, Jan. 16, 1991, abandoned.

[30] Foreign Application Priority Data

Jan. 16, 1990 [NL] Netherlands .................. 9000101

[51] Int. Cl.$^5$ .............................................. A23C 9/12
[52] U.S. Cl. ......................................... 426/34; 426/42; 426/43; 426/522; 426/565; 426/583
[58] Field of Search ................. 426/40, 43, 34, 40, 426/41, 42, 43, 580, 583, 586, 519, 520, 521, 522, 524, 564, 565

[56] References Cited

U.S. PATENT DOCUMENTS

| | | |
|---|---|---|
| 2,738,279 | 3/1956 | Stimpson et al. |
| 3,963,836 | 6/1976 | Henson et al. ............ 426/43 |
| 4,110,476 | 8/1978 | Rhodes ...................... 426/43 |
| 4,228,189 | 10/1980 | Henson et al. .......... 426/40 |
| 4,421,778 | 12/1983 | Kahn et al. |
| 4,544,436 | 10/1985 | Bily ............................ 426/43 |
| 4,837,036 | 6/1989 | Baker et al. ............... 426/43 |
| 4,840,813 | 6/1989 | Greenberg et al. ....... 426/565 |

FOREIGN PATENT DOCUMENTS

| | | |
|---|---|---|
| 0290054 | 11/1988 | European Pat. Off. |
| 0308091 | 3/1989 | European Pat. Off. |
| 2320056 | 3/1977 | France. |
| 2423163 | 11/1979 | France. |
| 297277 | 3/1965 | Netherlands. |

*Primary Examiner*—Joseph Golian
*Assistant Examiner*—Leslie Wong
*Attorney, Agent, or Firm*—Michael N. Meller

[57] ABSTRACT

This invention relates to a method of preparing thickener-free consumption ice or ice cream from a mixture of fermented milk constituents, including whey protein-rich products, and sugars, and optionally emulsifying agents, flavoring material and other conventional components by mixing the ingredients and freezing the mixture under aeration in a conventional manner. The method according to the invention is characterized by starting from a mixture of milk constituents in which the ratio of whey proteins to casein proteins is at least 50:50, fermenting said mixture to a pH between pH 4.3 and pH 5.5 and, after mixing all ingredients, aerating the mix in said pH range and freezing it to form ice cream with an overrun of at least 80% by volume, particularly at least 100% and wherein the mix is pasteurized before freezing and after fermentation.

19 Claims, No Drawings

METHOD OF PREPARING A FROZEN DAIRY DESSERTS

This application is a continuation of application Ser. No. 641,853, filed Jan. 16, 1991 now abandoned.

BACKGROUND OF THE INVENTION

1. Field of the Invention

This invention relates to a method of preparing a thickener-free consumption ice or frozen dairy dessert from a mixture of fermented milk constituents, including whey protein-rich products, and sugars, and optionally emulsifying agents, flavouring material and other conventional components by mixing those ingredients and freezing the mixture under aeration.

The term "consumption ice" as used herein refers to frozen dairy dessert produced from non-butter fat, sometimes referred to as 'mellorine'.

2. The Prior Art

Such a method is known from U.S. Pat. No. 4,110,476, except that in that method always microcrystalline cellulose is utilized in the mix as a stabilizer and thickener. A yogurt based frozen dairy dessert without thickener is mentioned in a publication in Nordeuropaeisk Mejeri-tidsskrift 8 (1977) 257–259. The formulation comprises, in addition to saccharose, exclusively milk derived products, i.e. in addition to ordinary yogurt 5 different whey products, obtained by lactose hydrolysis, from whey and from purified lactose, by ion exchange extraction, by ultrafiltration and still other techniques. This technique is rendered unattractive by the large number of ingredients, some of which are not available unless at high cost.

Accordingly, one can attempt to employ a slightly simplified formulation, using as an ingredient, in addition to ordinary yogurt, a whey protein preparation, which may or may not be combined with conventional thickeners, as in the U.S. specification referred to. But there are objections to such thickeners, which, in general, must be specified as such or by a code on the package, because the consumer tends to be suspicious regarding such ingredients that are not familiar to him.

From a whey protein-enriched yogurt of a normal type, fermented at elevated temperature with cultures containing *Lactobacillus bulgaricus* and *Streptococcus thermophilus*, a thickener-free yogurt based frozen diary dessert be prepared by freezing under aeration, which yields a palatable frozen dairy dessert of fairly good texture. But then the product exhibits the disadvantage of a relatively low "overrun" which in general is substantially less than 80%.

"Overrun" is the increase in volume of the frozen frozen dairy mass caused by the air incorporated as a result of the aeration of the mix during freezing, expressed as a percentage by volume of the volume without aeration. Such frozen dairy dessert with low overrun has a firm but at the same time actually too solid a texture, it has a not so desirable high calorie content and is relatively costly, all as compared with an equivalent volume of frozen dairy dessert with high overrun rates.

SUMMARY OF THE INVENTION

It has now been found that a yogurt based frozen dairy dessert with high overrun can be obtained by starting from a mixture of milk constituents, in which the ratio of whey proteins to caseins proteins is at least 50:50, fermenting said mixture to a pH between pH 4.3 and pH 5.5 and, after mixing all ingredients, aerating the mix in that pH range and freezing it to form ice cream with an overrun of at least 80% by volume, particularly at least 100% by volume.

It has been found that conventional yogurt cultures generally continue fermentation until a pH below 4.3 has been reached: mostly fermentation stops at approximately 4.0–3.0. During cooling, too, fermentation continues, though much slower, until the final pH typical for the starter culture is reached. Even in the frozen state, enzymatic processes may still continue.

When pH falls below 4.3, the air-retaining ability of the freezing yogurt mix without vegetable stabilizers proves insufficient to retain more than a limited volume of air of approximately 60–70% in the freezing mix. But when a culture of lactic acid bacteria is used which by nature have a limited acid-forming ability such that fermentation stops in the desired range between pH 4.3 and pH 5.5, a tart yogurt frozen dairy dessert can be prepared which freezes well with an overrun of more than 80% by volume. Particularly useful for this purpose are the well known ABT cultures, which chiefly contain germs *Lactobacillus acidphilus*, *Lactobacillus bifidus* and *Streptococcus thermophilus* such starters are conventional for the preparation of so-called acidophilus and bifidus milk products, fermented milk products with a different flavour and a different texture from the normal yogurt types prepared with *Lactobacillus bulgaricus* and *Streptococcus thermophilus*. Also, this acidophilus bifidus milk contains more dextrorotatory lactic acid than normal yogurt. Furthermore, the microorganisms in the ABT cultures tend to stop the production of lactic acid at a slightly higher pH than the *Lactobacillus bulgaricus* starters. The so-called AB starters also exhibit this property.

When the weakly acid-forming culture does not produce sufficient acid, the pH can, if desired, be lowered by adding for example lactic acid, particularly after the temperature has first been lowered to below 5° C. In that case the acid addition can be performed without objections, to a pH of approx. 4.3, without an undesirable texture developing in the ice cream owing to local protein agglomeration.

Similarly, a pH that has fallen somewhat too low can readily be corrected by means of alkaline reactive agents, but this does not correct any change of taste that has thereby occurred or any texture change of agglomerated casein proteins that has already occurred.

Yogurt based frozen dairy dessert according to the method invented can best be prepared with a solids content between 35 and 45% by weight, with a total protein content between 4 and 12% by weight.

DESCRIPTION OF THE PREFERRED EMBODIMENTS

A composition is preferred wherein such an amount of milk constituents is utilized that at least 2% by weight of casein protein is present in the mixture. In the form of whey products, whey powder, which may or may not be desalinated, desugared, lactase-treated or as whey protein concentrate or whey protein isolate, such much whey protein is then employed in the mix that in total at least 2% by weight of whey protein is present, preferably more.

But an increase of the whey protein content above the 50:50 ratio of whey protein to casein protein may, as was found, yield a particular effect on the texture and the properties of the frozen dairy dessert. In particular, it was found that when the ratio of whey protein to casein protein is equal to or higher than 66:34 the frozen dairy dessert may exhibit a surprising behaviour upon melting. Although the yogurt based ice cream traverses the transition from the solid state to the liquid state then, the form of the frozen dairy dessert remains well intact. A portion of frozen dairy dessert melting on a dish hardly sags, if at all; a yogurt based frozen dairy dessert lolly hardly drips. Consumption ice or yogurt based frozen dairy dessert of normal quality sag upon melting or drip, while the yogurt based frozen dairy dessert products prepared according to the invention in the aforementioned ratio of whey protein to casein protein are much stabler in retaining their form.

A further advantage is that the frozen dessert of the present invention has a longer shelf life than that of the closest prior art, i.e., Rhodes, U.S. Pat. No. 4,110,476. In comparative preference taste tests, the frozen dairy dessert of the present invention showed no appreciable diminishment in taste after nine weeks and twelve weeks of storage at −25° C. In comparison, the Rhodes frozen dairy dessert showed significant unfavorable differences in taste after nine weeks. These unfavorable differences (rancidity, bitterness, etc.) were even more pronounced after twelve weeks of storage of the Rhodes frozen dairy dessert. In contrast, there was no appreciable taste difference even after twelve weeks of storage of the frozen dairy dessert of the present invention.

Another particular advantage of the invention is that in principle the frozen dairy dessert obtained exhibits the desired properties well without using emulsifiers. The milk proteins present, which have a raised whey protein content, have amply sufficient emulsifying properties to keep the fat in frozen dairy dessert emulsified in a stable manner. This holds also in cases where no cream with already emulsified fat is used as a basic ingredient, and likewise in cases where butter or isolated milk fat together with skim milk or a solution of skim milk powder and whey protein concentrates is utilized. The homogenizing processes which the frozen dairy dessert mix is subjected to can then be well performed in such a way that after mixing the molten milk fat in the milk a homogeneous fat distribution is effected. Entirely, the same technique is applicable when instead of frozen dairy dessert, which by legal standards should contain only milk fat, consumption ice is prepared according to the invention.

One starts from fat or oil which is not derived from milk. Thus frozen dairy dessert of a less expensive type can be made, the disadvantage being, however, that the taste of a yogurt based frozen dairy dessert based on real milk fat is generally rated higher than that of a yogurt frozen dairy dessert of consumption ice quality.

The taste of the frozen dairy dessert obtained can be varied by admixing conventional ice cream ingredients, such as flavouring, fruit, nuts, chocolate and the like. Provided such admixtures are of the proper bacteriological quality, they can be added after pasteurization of the frozen dairy dessert mix. This is advantageous when admixing fruit, nuts and the like, in that the texture of the mixture is not disturbed by a homogenization process. The choice of the bacteria culture which the product is fermented with, also affects the taste. Besides a culture containing *Lactobacillus acidophilus* as well as *L. bifidus* and *Streptococcus thermophilus* (ABT culture), a culture with just the lactobacilli, a so-called AB culture, can be chosen.

One may also search for cultures that form more, or less, slime than the conventional cultures. Mixed cultures that are conventionally used for other mildly fermented milk products, for instance for kefir, can also be used according to the invention, provided they satisfy the required degree of fermentation. Thus the type of flavour of the frozen dairy dessert product obtained can be influenced.

Further, the proportion of milk components in the frozen dairy dessert mix can be increased while simultaneously increasing the whey protein content as related to the total protein by utilizing whey products hydrolyzed using lactase in the mix, instead of dextrose and/or saccharose. This hydrolysis renders the milk sugar sweeter in taste and at the same time prevents the problem of "sandiness" caused by crystallization of milk sugar. A hydrolyzed whey, which may or may not be desalinated, is considerably cheaper than an equivalent mixture of dextrose and whey protein concentrate with the same sugar concentration and protein contribution.

The method invented will be illustrated in and by the following Examples.

EXAMPLE 1

From 8.8 kg skim milk powder, 3.5 kg whey protein concentrate (75% protein) and 66.8 l water a milk solution was prepared, to which 32.9 kg cream (42.5% fat) was added. The milk prepared at 50° C. was deaerated at that temperature for 3 h, followed by heating to 80° C. and two-step homogenization at 250 atm/50 atm. After cooling to a suitable fermentation temperature, a starter culture of a conventional starter of the type ISt for fermented milk products was added to this milk. After 15 h incubation at a temperature of 35° C., pH had dropped to 4.0 due to the formation of lactic acid. To the fermented product 21 kg saccharose and 7 kg dextrose were added. Agitation rendered the mass homogeneous, the sugar going into solution and the base for yogurt based frozen dairy dessert exhibiting a smooth thin-fluid viscosity. The liquid was pasteurized at 80° C. in a through-flow pasteurizer with a residence time of 30 sec and subjected to two-step homogenization at 50 atm/0 atm.

Freezing of portions of this frozen dairy dessert mix by means of a scraped heat exchanger conventionally used for that purpose yielded yogurt based frozen dairy dessert of good quality with an agreeable tart flavour and good consistency, but with a volume overrun of about 65%.

EXAMPLE 2

In entirely the same manner, a milk was prepared consisting of skim milk powder, whey protein concentrate, water and cream, which milk was cooled to 35° C. after deaeration and homogenization at 80° C.

To the milk a starter of the ABT type was added. Such a mixed starter, which is conventional for so-called acidophilus/bifidus milk products, contains germs of *Lactobacillus acidophilus* and *Lactobacillus bifidus* as well as germs of *Streptococcus thermophilus*, approximately in the ratio of 40%/40%/20%.

After 15 h incubation at 35° C., pH had dropped to pH 4.35.

Again saccharose and dextrose were added to the fermented milk, the mixture was agitated and pasteurized at 80° C. Upon freezing this yogurt frozen dairy dessert mix in the same freezer as in Example 1, it was found a yogurt based frozen dairy dessert of equally good quality, of good taste and consistency was obtained. However, the overrun of the frozen dairy dessert according to the method invented was considerably higher, namely between 80 and 90%.

EXAMPLE 3

Entirely in accordance with Example 1, a mixture of 73.4 kg skim milk, 4.05 kg whey protein concentrate (75%) and 32.9 kg cream was prepared, which after 3 h of deaeration at 50° C. was subjected to two-step homogenization at 80° C.

Fermentation with an ISt starter and sugar addition occurred as indicated above with reference to Example 1. The yogurt frozen dairy dessert mix with a pH of 3.95 was pasteurized and frozen in the conventional manner.

It was found that the portions of frozen dairy dessert thus obtained exhibited good consistency and an agreeable flavour, and, moreover, when such a portion was placed on a dish and allowed to thaw quietly, its form proved to remain very stable during melting. After complete melting, the mass retained its external form, much like a pudding, without a thin layer of liquid melting off, as occurs in ice creams of conventional quality. Also when the mix was frozen in the form of frozen dairy dessert lollies, the yogurt based frozen dairy dessert obtained exhibited extremely attractive melting behaviour in that also after thawing virtually no molten liquid dripped off the frozen dairy dessert.

The overrun of this frozen dairy dessert prepared with ISt starter was approximately 70%.

Repetition of this test with a frozen dairy dessert mix which had been soured only to pH 4.3 using an ABT starter, yielded a type of yogurt based frozen dairy dessert of the same attractive type, with the same particular melting qualities. The overrun of the frozen dairy dessert, however, could be considerably higher than in the more acid frozen dairy dessert that had been prepared with ISt starter namely, 95%.

Similarly, a favourable overrun was achieved with a frozen dairy dessert mix which upon fermentation with ABT starter soured only to pH 4.45. After treatments as described including sugar addition, however, the mix was cooled to 5° C. and then adjusted to pH 4.30 with a diluted lactic acid solution. Then the mix was pasteurized and homogenized.

EXAMPLE 4

In 92.3 kg skim milk 4.05 kg whey protein concentrate was dissolved at a temperature of approx. 50° C. After deaeration for 3 h an amount of 14.0 kg anhydrous butterfat, also heated to 50° C., was added to the milk, whereafter emulsification was effected by two-step homogenization at 250 atm and 50 atm at 80° C.

Entirely as in the preceding Examples, at 35° C. a starter culture, this time of the AB type, was added and incubated. After pH reached the value 4.3, 21 kg saccharose and 7 kg dextrose were added. Then pasteurization was done at 80° C. using a through-flow pasteurizer, followed again by homogenization.

EXAMPLE 5

According to the same formulation as employed in Examples 1-4, a mixture was prepared of cream, skim milk, and whey protein concentrate in a ratio between those components such that the ice cream mix obtained after fermentation and admixing sugars contained 2% casein protein and 6% whey protein.

The cream mixture to be fermented was mixed and deaerated at 50° C. Homogenization under standard conditions, at 250 atm and 50 atm, after heating to 80° C., yielded the milk to be fermented, which after cooling to 35° C., was inoculated with a commercially available starter of the ABT type. At pH 4.4 sugar was added as in the preceding Examples.

After a pasteurization step and a homogenization step the mix could be frozen in a conventional ice cream freezer to form frozen dairy dessert of very good appearance and good taste, body and with a particularly attractive melting behaviour. It was found the overrun of the ice cream could increase to 120% without any special steps.

When the mix is processed to make frozen dairy dessert for commercial purposes, the overrun must not exceed 100%. By controlling the freezing conditions to avoid the overrun exceeding that limit, a comparable batch of frozen dairy dessert could be prepared which was distinguishable from yogurt frozen dairy desserts of conventional quality in that it indeed exhibited an overrun of 100% as exactly as possible.

EXAMPLE 6

According to the same method as set forth in Example 2, fruit yogurt was prepared. To that effect, after the final pasteurization step, a sterile strawberry concentrate was added to the mix in the ratio of 15% by weight of fruit concentrate to 85% by weight of mix.

Other types of fruit, nuts, chocolate particles and the like, too, proved to lend themselves well for utilization in the yogurt mix prepared as in Example 2. It did prove necessary to adjust the method so that the additions would not be disturbed by the treatment carried out, so as to prevent, for example, the chocolate particles from melting during heating and the like.

When utilizing soft, low-pectin fruits, it was necessary to employ a pectin-enriched concentrate, which did not essentially disturb the character of the thickener-free yoghurt frozen dairy dessert.

We claim:

1. A method of preparing thickener-free consumption ice or frozen dairy dessert from a mixture of fermented milk constituents, including whey protein-rich products, sugars, and optionally emulsifying agents, flavoring material and other conventional components by mixing the ingredients and freezing the mixture under aeration in a conventional manner, which comprises starting from a mixture of milk constituents in which the ratio of whey proteins to casein proteins is at least 50:50, fermenting said mixture to a pH between pH 4.3 and pH 5.5 and, after mixing all ingredients, aerating the mix in said pH range and freezing it to form the frozen dairy dessert with an overrun of at least 80% by volume and wherein the mix is pasteurized before freezing and after fermentation.

2. A method according to claim 1, wherein fermentation to a pH between pH 5.5 and pH 4.3 is performed by adding a mixed culture of lactic acid bacteria of a type having such a limited acid-forming capacity that fermentation stops in the desired pH range.

3. A method according to claim 2, which comprises utilizing a mixed culture in which at least the species *Lactobacillus acidophilus* and *Lactobacillus bifidus* are present.

4. A method according to claim 3, which comprises utilizing a mixed culture in which at least the species

*Lactobacillus acidophilus, Lactobacillus bifidus* and *Streptococcus thermophilus* are present.

5. A method according to claim 1 which comprises by fermenting the mixture of milk constituents by adding organic acid at a temperature below 5° C. to adjust to the desired pH in the range between pH 4.3 and 5.5.

6. A method according to claim 1, wherein the solid content of the mixture at freezing is between 35 and 45% by weight.

7. A method according to claim 1 wherein the protein content of the mixture is between 4 and 12% by weight.

8. A method according to claim 1 wherein at least 2% by weight of casein protein is present in the mixture in the form of milk constituents and that such an amount of whey protein-rich products has been added thereto, that the whey protein content is at least equal to the casein content.

9. A method according to claim 8, wherein the whey protein content is at least twice as high as the casein content.

10. A method according to claim 1 wherein the sugars consist entirely or predominantly of hydrolyzed lactose.

11. A method according to claim 1, which comprises preparing the frozen dairy dessert by exclusively employing cream, milk fat or a milk fat-containing product as a fat-containing material.

12. A method according to claim 1 wherein the overrun is at least 100% by volume.

13. A method according to claim 4 which comprises fermenting the mixture of milk constituents by adding organic acid at a temperature below 5° C. to adjust to the desired pH in the range between pH 4.3 and 5.5.

14. A method according to claim 13 wherein the solid content of the mixture at freezing is between 35 and 45% by weight.

15. A method according to claim 14 wherein the protein content of the mixture is between 4 and 12% weight.

16. A method according to claim 15 wherein at least 2% by weight of casein protein is present in the mixture in the form of milk constituents and that such an amount of whey protein-rich products has been added thereto, that the whey protein content is at least equal to the casein content.

17. A method according to claim 16 wherein the whey protein content is at least twice as high as the casein content.

18. A method according to claim 17 wherein the sugars consist entirely or predominantly of hydrolyzed lactose.

19. A method according to claim 18 which comprises preparing the frozen dairy dessert by exclusively employing cream, milk fat or a milk fat-containing product as a fat-containing material.

* * * * *